(12) United States Patent
Richter et al.

(10) Patent No.: US 10,621,757 B2
(45) Date of Patent: Apr. 14, 2020

(54) METHOD FOR PRODUCING A 2D IMAGE OF A 3D SURFACE

(71) Applicant: DIEHL AEROSPACE GMBH, Ueberlingen (DE)

(72) Inventors: Christian Richter, Rostock (DE); Martin Luboschik, Cammin (DE); Steve Duebel, Niex (DE); Stefan Mueller-Diveky, Schoeneck (DE)

(73) Assignee: DIEHL AEROSPACE GMBH, Ueberlingen (DE)

( * ) Notice: Subject to any disclaimer, the term of this patent is extended or adjusted under 35 U.S.C. 154(b) by 43 days.

(21) Appl. No.: 15/988,028

(22) Filed: May 24, 2018

(65) Prior Publication Data

US 2018/0342088 A1 Nov. 29, 2018

(30) Foreign Application Priority Data

May 24, 2017 (DE) .......................... 10 2017 005 002

(51) Int. Cl.
*G06T 11/00* (2006.01)
*G06T 17/05* (2011.01)
(52) U.S. Cl.
CPC ............ *G06T 11/006* (2013.01); *G06T 17/05* (2013.01); *G06T 2200/04* (2013.01);
(Continued)
(58) Field of Classification Search
None
See application file for complete search history.

(56) References Cited

U.S. PATENT DOCUMENTS 6,411,298 B1 * 6/2002 Goto ....................... G06T 15/20
345/419
2003/0160788 A1 8/2003 Buehler
(Continued)

OTHER PUBLICATIONS

Tatzgern, M., "Situated Visualization in Augmented Reality", Doctoral Thesis submitted to Graz University of Technology, Graz, Austria, Jun. 2015.
(Continued)

*Primary Examiner* — Tapas Mazumder
(74) *Attorney, Agent, or Firm* — Scully Scott Murphy and Presser

(57) ABSTRACT

In a method for producing a 2D image (18) of a 3D surface (2) on a viewing area (8) of a vision cone (12) which extends from a viewing position (14) to the 3D surface (2), wherein at least one marker location (20a,b) is assigned to the 3D surface (2), assigned to each image location (24) of the viewing area (8) is a depth dimension (T), which is correlated to the respective distance (A) between the viewing area (8) and the 3D surface (2) along a respective straight line (26) from the viewing position (14) through the image location (24) to the 3D surface (2), for at least one of the marker locations (20a,b) located within the vision cone (12), a marker field (28a,b) is produced in the 2D image (18), wherein the marker field (28a,b) in the 2D image (18) is placed as closely as possible to the image location (24a,b) of the marker location (20a,b), with the additional condition that all image locations (24) of the marker field (28a,b) have depth dimensions (T) which are greater than the depth dimension (Ta,b) of the image location (24a,b) of the marker location (20a,b), after placement of the marker fields (28a,b) a projection image (10) of the 3D surface (2) onto the viewing area (8) is placed therebehind in the 2D image (18).

15 Claims, 3 Drawing Sheets

(52) U.S. Cl.
CPC ...... *G06T 2215/06* (2013.01); *G06T 2215/16* (2013.01); *G06T 2219/004* (2013.01)

(56) References Cited

U.S. PATENT DOCUMENTS

| | | | | |
|---|---|---|---|---|
| 2011/0264362 A1* | 10/2011 | Van Raamsdonk | ..... | G06T 17/05 701/532 |
| 2014/0160114 A1* | 6/2014 | Stevenson | ................ | A61B 8/06 345/419 |

OTHER PUBLICATIONS

"Kinect", Wikipedia article, v. May 13, 2017.
"Depth map", Wikipedia article, v. Feb. 17, 2017.
Tatzgern, M., "Hedgehog Labeling: View Management Techniques for External Labels in 3D Space", IEEE Virutal Reality 2014 (Mar. 29-Apr. 2, 2014), Minneapolis, Minnesota, USA, pp. 27-32.
Schulze et al., "Label management: Keeping complex diagrams usable", Proceedings of 2016 IEEE Symposium on Visual Languages and Human-Centric Computing (VL/HCC) (Sep. 4-8, 2016), pp. 3-12.
Luboschik, Martin, "Particle-Based Labeling: Fast Point-Feature Labeling without Obscuring Other Visual Features", IEEE Transactions on Visualization and Computer Graphics (Nov.-Dec. 2008), vol. 14, No. 6, pp. 1237-1244.

\* cited by examiner

METHOD FOR PRODUCING A 2D IMAGE OF A 3D SURFACE

BACKGROUND OF THE INVENTION

The invention relates to a method for producing a 2D image of a 3D surface. It is desired in many fields of technology to produce a 2D image of a 3D surface. The 3D surface in this case is present in the form of a data structure. In an example, the invention is to present a detail of a 3D terrain, in particular part of the Earth's surface, stored in computerized form on a two-dimensional area, for example a screen, in the form of a 2D image. Frequently, specific markers are assigned to the 3D surface at specific locations, what are known as marker locations. The markers are e.g. text, symbols, graphics etc., such as names of towns, streets, hills, rivers etc. located in the terrain on the Earth's surface. Such marker locations are also typically referred to as POI (point of interest). When imaging a detail of the 3D surface that contains a marker location in the 2D image, it is desirable e.g. to denote the marker location—that is to say the imaging location thereof in the 2D image—and indicate it with a marker symbol and/or a marker field (label) that is assigned to the marker location and includes e.g. the marker, such as the relevant town or street name.

DISCUSSION OF THE PRIOR ART

A corresponding procedure is known, for example, from the article "'Particle-based labeling: Fast point-feature labeling without obscuring other visual features'. IEEE transactions on visualization and computer graphics. Martin Luboschik, Heidrun Schumann and Hilko Cords, 14(6): 1237-1224, 2008". The particle-based labelling algorithm ensures an occlusion-free, proximal and real-time-capable inscription for a large number of labels. The algorithm here proceeds as follows: First, an image of the scene to be inscribed is rendered before the labels are placed. All partial regions of the image in which no labels must be placed are filled with virtual particles, also known as conflict particles. Next, the algorithm places the labels using various strategies. First, an attempt is made here to place the labels in a free region at the associated POI. If this is unsuccessful, the label is positioned at a different place, and a connecting line is drawn between the POI and the label. Once a suitable label position is found, the region occupied by the label is likewise filled with conflict particles so that no other label can be placed at that site. This ensures occlusion-free labelling. All labels are now placed one after the other following said strategy for as long as free space is still available. If the labels additionally have a priority, labels of higher priority are positioned before labels having lower priority.

SUMMARY OF THE INVENTION

The present invention is directed to an improved method for producing a 2D image of a 3D surface with marker locations.

The method of the present invention serves for producing a 2D image of a 3D surface. The 2D image is produced on a viewing area (image plane) of a vision cone. The vision cone extends, starting from a viewing position (viewpoint), to the 3D surface. At least one marker location is assigned to the 3D surface. A depth dimension is assigned to each image location of the viewing area. The depth dimension correlates to a respective distance between the viewing area and the 3D surface, or is correlated thereto, i.e. is in particular said distance, or a normalized distance value. The distance is the respective straight line between viewing area and 3D surface (location of incidence of the straight line), wherein the straight line extends in particular from the viewing position through the image location to the 3D surface. The straight line does not necessarily extend from the viewpoint through the image plane to the 3D surface. In CG (computer graphics), it also commonplace to direct the straight line always perpendicularly through the image plane to the 3D surface. Geometrically, the straight line, the length of which is ascertained, then does not run through the viewpoint. The reason for this variation is the utilization of the z-buffer of the graphics card, which only takes the z-value into account. The distance and/or the depth dimension can be ascertained in any desired system of measurement, e.g. in the real Earth coordinate system in the case of terrain data. For at least one of the marker locations that are situated within the vision cone, one marker field is produced in the 2D image. The marker field is placed in the 2D image as closely as possible to the image location of the marker location—in particular occlusion-free with respect to other marker fields. The condition "as closely as possible" is constrained by the additional condition that all image locations of the marker field must have depth dimensions that are greater than the depth dimension of the image location of the marker location. In the least favourite case, not even the first marker field may be placed. After the (in particular occlusion-free) placement of the marker field or fields, a projection image of the 3D surface is placed behind the marker fields in the 2D image on the viewing area. The 2D image is thus the image of the projection of the 3D surface onto the viewing area.

The 3D surface in this case is present in the form of a data structure. These are in particular what are known as terrain data, i.e. a detail of the terrain profile of the Earth's surface imaged in a data structure, wherein e.g. data of the shape of buildings etc. are also captured. In the method, in particular the part of the 3D surface that is located within the vision cone is ascertained first. Only this is to be imaged in the 2D image, and also only the marker locations which are located therein are to be taken into account in the method.

The image location is a location on the viewing area, the image location in particular corresponds to an image pixel of the 2D image to be produced.

"After placement" means that either none of the marker fields could be placed or as many marker fields as possible have been placed (until no space is left for a further marker field) or all marker fields associated with the marker locations in the 2D image have been placed. Placement in the 2D image is also for example no longer possible if no region in the size of the marker field is available any more in the 2D image which does not contain a location having a smaller depth dimension.

The placement of marker fields can also be stopped once a specific maximum number of marker fields has been placed in the 2D image or a specific maximum total area is covered by all previous marker fields etc.

If a straight line from the viewing position through an image location is not incident on the 3D surface, this image location is assigned a depth dimension that corresponds to the distance value "infinite" or at least corresponds to a distance value that is greater than the maximum of all distances between image locations and the 3D surface for the 2D image.

Each marker location in particular has, as a marker, a description or property: for example designations of towns, rivers, hills, streets or buildings etc.

The vision cone extends, starting from the viewing position, along a straight line of sight. The viewing area is perpendicular to the straight line of sight and is located between the viewing position and the 3D surface. The vision cone is a projection cone of the viewing area starting from the viewing position in the direction of the 3D surface.

If a marker field must be placed "too far" from an image location of the marker location (i.e. the distance exceeds a specific limit value), a line is drawn or presented in the 2D image in particular from the marker field to the image location of the marker location to indicate the relationship between the marker field and the marker location or the image location thereof.

The principle placement "as closely as possible", that is to say with as small a distance as possible in the 2D image, is performed in accordance with algorithms and strategies which are known or typical in the art and will not be explained here in further detail. Reference is made in this respect for example to the above-mentioned particle-based labelling algorithm, but all other algorithms and strategies are also feasible. In addition to corresponding placement criteria, the depth dimension also serves as an additional criterion for forbidden placement locations which would result from a conventional placement algorithm.

The marker location is in particular a POI. Within the region of the 3D surface to be imaged, first selected in particular is a subgroup of marker locations that are present there and which are to be taken into account in the method, while all other marker locations are ignored. For example, only marker locations of a specific group, such as town names or street names, are selected, or marker locations such as airports or names of hills. Also feasible are marker locations with a specific distance from a target location etc. The depth dimensions are ascertained in particular as normalized depth dimensions. In particular, all depth dimensions are stored in a separate depth image, which is different from the 2D image, in particular different in terms of memory.

The method according to the invention prevents a marker field from being placed in the 2D image such that it occludes a part of the 3D surface that is closer to the viewing area than the marker location. This produces what is known as occlusion-free placement of marker fields while taking particular account of the underlying topography of the 3D surface. The result is that marker fields in the 2D image are placed either only in regions which are not covered by the image of the 3D area and/or occlude only parts of the 3D area which are located behind the depth plane of the marker location as viewed from the viewing position.

In a preferred embodiment, the 2D image is a digital image with pixels. Every location of the viewing area that corresponds to a pixel in the 2D image is selected as one of the image locations. The number of image locations is consequently the same as the pixel number. As a result, a depth dimension is assigned to each portion of the 3D surface which is imaged in the form of a pixel. This produces a number of depth dimensions to be ascertained which is reasonable in terms of calculation effort.

In a preferred variant of this embodiment, a total value for all distances within the projection cone of the relevant (extended) image location onto the 3D surface is ascertained as a depth dimension for a pixel or an image location (having a specific area, corresponding to the pixel area, e.g. square or rectangle). The total value is in particular an average, a minimum or a maximum of all distances occurring within the projection cone or of the corresponding distance region. In this way, a depth dimension is ascertained for each pixel which is algorithmically reasonable.

In a preferred embodiment, the projection image of the 3D surface onto the viewing area, that is to say the view of the 3D surface alone to be imaged in the 2D image, is ascertained from the 3D surface by a rendering algorithm. In particular, all depth dimensions are ascertained simultaneously by way of the rendering. This produces a real-time capability of the method. The depth dimensions are stored, as mentioned above, possibly in a separate depth image. A rendering algorithm can be performed in a known manner particularly quickly and effectively, with the result that this does not oppose a real-time capability of the method. Rendering algorithms are sufficiently known from the art and will not be explained in more detail here.

In a preferred embodiment of the invention, an order for marker locations is established. The placement of the marker fields is then performed in the order of the marker locations until either all marker fields have been placed or until no space is left in the 2D image for another marker field to place it with the above-mentioned conditions. The criteria for the order are here arbitrary and represent in particular the relevance of the marker location in a specific context. For example, in the case of towns, these are ordered by number of inhabitants or by distance of the marker locations from a target location. It is thus ensured in the method that at least the respectively most important marker locations are presented in the 2D image in the order of their importance.

In a preferred embodiment, at least one, preferably all image locations of the marker locations are denoted in the 2D image, in particular before placement of the marker fields begins. The mark or entry is effected for example by a coloration and/or in the form of a graphic symbol which is perceivable in the 2D image in another way, or the like. It is thus ensured at least that at least the image locations of marker locations are indicated or perceivable in the 2D image, even if no space may be left for the placement of a corresponding marker field. The image location can also be indicated by the end of a line coming from the associated marker field. In particular, the image locations of the marker locations are thus denoted in the 2D image by way of a graphic marker. The latter is for example a point, a symbol, line end etc.

In a preferred embodiment of the invention, for the placement of at least two marker fields, a second one and each further marker field is arranged in the 2D image in an occlusion-free manner with respect to the already placed marker fields. This consequently gives an additional condition for the placement of the marker fields which are only allowed to be placed next to one another or in an occlusion-free manner, such that none of the marker fields covers, not even partially, another one. Alternatively, for example in the case of covering, marker fields with a greater depth dimension of the image location could at least partially disappear behind those having a smaller depth dimension. Even though occluded marker fields may then not be entirely legible, at least depth information is provided by way of the occlusion.

In a preferred embodiment, a location of a real and/or virtual camera for recording the projection image of the 3D surface is selected as the viewing position. Consequently, the 2D image corresponds to a real and/or virtual camera image and is therefore intuitively particularly meaningful. A real camera can here produce in particular a real-time image of the observed 3D surface to use it in the 2D image. The virtual camera can in particular produce an occlusion-free view or ideal view (e.g. without clouds or fog or during daylight) of the 3D surface.

In a preferred embodiment, a terrain or part of the Earth's surface is used as the 3D surface. Alternatively or in addition, a current or virtual position of an aeroplane with respect to the 3D area, in particular the Earth's surface, is used as the viewing position. Alternatively or in addition, at least part of a viewing field from an aeroplane, in particular cockpit, is selected as the viewing area. The viewing field is here established e.g. from all possible viewing angles and viewing directions which are possible for a pilot or similar from an aeroplane's cockpit.

For example, in particular real or virtual views from an aeroplane at a specific position above the Earth's surface can be presented as a view onto the Earth's surface as a 2D image and be provided with marker fields in an occlusion-free manner with respect to the Earth's surface.

In a preferred embodiment of the method, an alphanumeric denotation of the marker location, in particular of the above-mentioned markers, is inserted into the marker field. This is, for example, the name of a town a river or an airport or an altitude of a hill.

In a preferred embodiment of the method, a size of the marker field is determined in dependence on the content thereof. The size is determined for example by the size of the text or the font of a text in the marker field or of a symbol or another graphic content placed in the marker field.

In a preferred embodiment, a size of the marker field is selected in dependence on the depth dimension of the associated marker location. Here, in particular the entire marker field together with the text, symbols etc. contained therein are scaled starting from a standard size. In particular, marker fields are reduced in size as the distance of the marker location from the viewing area increases. For example, in the presentation of the 2D image, a perspective impression of marker fields is brought about also by marker fields which are located further away being presented as being smaller.

In particular, first a text having a standard font size is thus selected as the content of the marker field, and the size of the field (frame) is adapted corresponding to the text length. The field is then scaled as a whole (with the text).

In a preferred variant of this embodiment, for all marker fields, scaling of the size thereof merely between a minimum and a maximum dimension is performed. The dimension can here be a width, height, area of the marker field, a smallest or largest font size for contained text etc. All marker fields are thus scaled with font sizes between a minimum and a maximum. It is ensured in this way that none of the marker fields has a text which is too small or too large or that marker fields do not take up too much space or are no longer sufficiently recognizable for being too small a presentation.

In a preferred embodiment of the method, the placement "as closely as possible" to the image location of the marker location is performed by way of a placement strategy in accordance with the "particle-based labelling algorithm" by Luboschik et al., as explained above. Said algorithm offers a particularly advantageous starting point for the method according to the invention, because by itself it already achieves a satisfying placement for marker fields, which is then improved further by way of the invention.

The invention is based on the following findings, observations or considerations and also includes the following embodiments. The embodiments are here also referred to as "the invention", partly for the purposes of simplification. The embodiments can here also contain parts or combinations of the above-stated embodiments or correspond to them and/or possibly also include embodiments which have not yet been mentioned.

The invention is based on the finding that, in 2D labelling, the three-dimensional scene structure should be taken into account. Consequently, e.g. nearby hills cannot be occluded by labels of remote POIs. In addition, the depth perception of the labels is improved by a variable font size and thus the spatial impression of their position is improved.

The invention is based on the idea of realizing the presentation of labels (markers/marker fields/marker locations) in a three-dimensional terrain presentation (projection image of the 3D surface) in real time and without occlusion.

The invention is based on known 2D labelling technologies, wherein realization in real-time in the case of many POIs is a challenge for the invention. It is based on placement in 3D next to the POI to be labelled or on the terrain, but with an attempted solution to the occlusion problem.

The invention is based on a combination of terrain rendering and particle-based labelling with distance-based scaling and integration of the depth information from the terrain image.

The invention refers to the real-time-capable, occlusion-free labelling of "points of interest" (POI) in 3D terrain. Here, the following requirements apply to the placement of the labels:

visibility—requires occlusion-free arrangement of the labels, i.e. no label may cover another.

legibility—also ensures the recognizability of the label independently of the distance from the POI.

proximal placement—places the label as closely as possible to the POI.

spatially correct placement—also takes into account the underlying terrain topography.

real time—places the labels without delay during the navigation through the terrain.

The definition of "real time" is here to be understood from the view of the CG as follows: The present method also requires a specific calculation time, which results in delays. What is special about the real-time capability is that the calculation time never exceeds a given length, e.g. 16 ms, and therefore ensures that the delay is not perceived.

What is desired is a labelling algorithm which can simultaneously satisfy all five criteria mentioned for the labelling in 3D terrain.

The invention is therefore based on the idea of expanding particle-based labelling for a point-based, occlusion-free labelling in 3D terrain, in which the placed labels are integrated seamlessly in the three-dimensional scene. In the process, the underlying terrain topography is intended to be taken into account and the labels are scaled in dependence on their distance from the observer. This gives the following expansions:

the introduction of depth particles to take the terrain topography into account during the placement of the labels, and the scaling of the label size with respect to the distance of the camera (viewing area or viewing position to the 3D surface) to support the spatial perception of the labels.

The procedure in principle is divided into three steps: 1) rendering the terrain, 2) configuration and 3) performance of the labelling algorithm.

The terrain is first presented as a 2D image with a suitable rendering algorithm. At the same time, the corresponding depth image is measured and buffered. The depth image contains in each image point the normalized distance of a terrain point (location on the 3D surface) from the camera (viewing position or viewing area). Subsequently, the POIs (marker locations) are entered as marker symbols (graphic markers) e.g. in the form of points at the corresponding positions (image location of the marker location). The placement (and the associated rendering for finishing the 2D image) of the associated labels, on the other hand, is only performed in the last step.

The labelling algorithm receives, as entry, in particular the following information:
   the buffered depth image for positioning the labels,
   the position and distance of the POIs in the output image for improving the depth perception,
   the priority of the POIs for determining the order for the placement of the labels,
   the size of the labels in the output image for taking account of the perspective and for ensuring legibility.

The depth image and the position and distance of the POIs are known from the rendering step. The priority of a POI captures its relevance in a given context. It can be determined e.g. for towns by way of the number of inhabitants and the distance from the current viewing point (viewing position/viewing area). The label size depends on the label text, on the selected font size and on the distance from the viewpoint. It must be calculated individually for each POI. First, the size of the label in accordance with text and font size is calculated and then scaled accordingly in order to produce a perspective impression of the labels in the 3D terrain. The scaling is performed in dependence on the calculated distance of the associated POI. In order to ensure in each case the legibility of the text, a minimum and a maximum font size are specified, between which the font size is scalable.

The underlying idea for taking account of a spatially correct placement is to introduce what are known as depth particles. To this end, the image points of the depth image are converted to depth particles. Consequently, the free space is filled with particles and therefore offers information relating to the present terrain in every region.

Subsequently, the usual placement strategies are performed for each label. However, a label can be placed in a region only if said region contains no particles of a label or no depth particles that have a lower depth value than the label to be placed. If the potential label position satisfies the condition, the region is filled with label particles. This ensures that the labels are placed spatially correctly and consequently a label is placed only over or in front of the terrain.

The labelling algorithm is terminated once all labels have been placed in accordance with their priority, or when no free space for the placement of labels is available anymore. The result is an image in which, by taking account of the depth information and the distance-based scaling, the placed labels are integrated seamlessly into the 3D terrain. Adapting the particle-based labelling thus provides an occlusion-free and real-time-capable 3D labelling in the terrain, which fulfills all stated criteria.

In accordance with the invention, this gives occlusion-free 3D labelling taking into account depth information in the 3D terrain. The invention describes a labelling algorithm for points of interest in the 3D terrain, which performs occlusion-free and real-time-capable placement of labels with particular consideration of the underlying terrain topography. In accordance with the invention, this provides real-time-capable, occlusion-free labelling in the 3D terrain with consideration of the seamless placement of the labels in the terrain topography.

BRIEF DESCRIPTION OF THE DRAWINGS

Further features, effects and advantages of the invention can be gathered from the following description of a preferred exemplary embodiment of the invention and the appended figures. Here, in a schematic diagram.

DETAILED DESCRIPTION OF THE DRAWINGS

Figure 1:
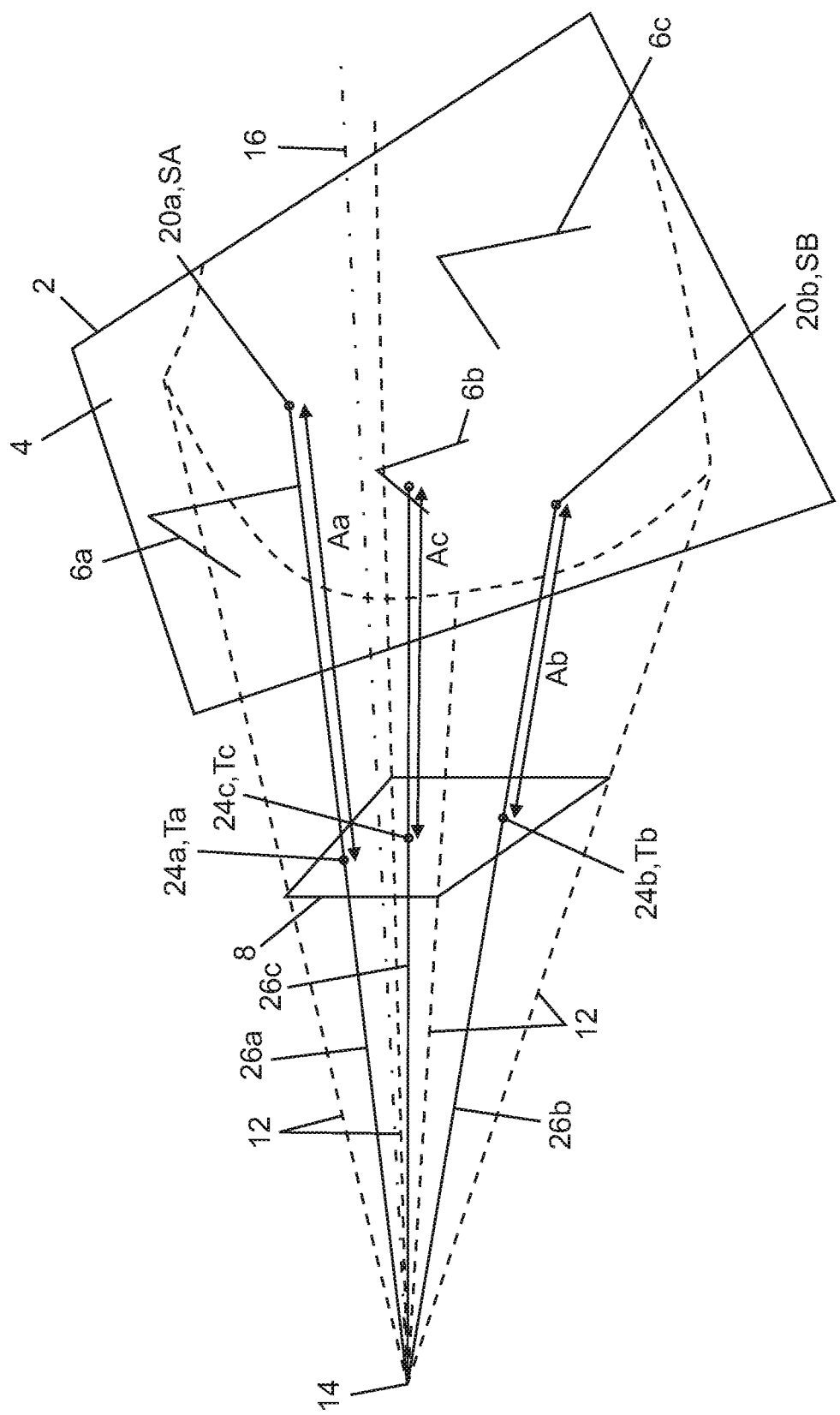
FIG. 1 shows a 3D surface with a vision cone.

FIG. 1 shows, in explanation relating to the method according to the invention, a 3D surface 2, in this case a terrain 4 in the form of a landscape or of a detail of the Earth's surface with three hills 6*a-c*. The intention is to produce a 2D image depicted in FIG. 2, or projection image 10 of the 3D surface 2, on a (virtual) viewing area 8. The projection is effected on the basis of a (virtual) vision cone 12, which extends starting from a (virtual) viewing position 14, along a (virtual) straight line of sight 16, to the 3D surface 2. The viewing area 8 is here oriented perpendicular to the straight line of sight 16. The vision cone 12 is the projection of the viewing area 8 to the 3D surface 2. For this reason, the part of the 3D surface 2 that is located within the vision cone 12 and is indicated in FIG. 1 by way of a dashed border is imaged in the projection image 10.

The viewing position 14 in the example is the location of a virtual camera for recording the projection image 10 of the 3D surface 2. The viewing position 14 in the example is also a current position of an aeroplane (not illustrated), which moves with respect to the real terrain 4, which is also present virtually in the form of the 3D surface. The viewing area 8 is selected as part of a viewing field of a pilot of the aeroplane who is looking out of the aeroplane's cockpit onto the terrain 4, that is to say it shows a detail of all possible viewpoints from the cockpit.

The projection image 10 is intended to be part of a 2D image 18 in accordance with FIG. 2 to be produced, which contains further image contents, as will be explained below:

Two marker locations 20*a,b* are assigned to the 3D surface 2 in the example. The marker locations 20*a,b* denote locations of particular interest (POI) on the 3D surface 2, in the present case towns with the markers SA and SB—also referred to as denotation of the marker locations 20*a,b*—in the terrain 4. The markers SA and SB contain, or are, the respective names of the towns at the marker locations 20*a,b*. The marker locations 20*a,b* in the example are POIs in the context of the use of the 2D image 18, in this example as a navigation image for an aeroplane (not illustrated) flying over the terrain 4.

The viewing area 8 is divided into image locations 24, with each image location 24 corresponding to a pixel 36 of the digital image in the form of the 2D image 18. A depth dimension T is assigned to each image location 24 of the viewing area 8. The depth dimension T correlates to the respective distance A between the viewing area 8 and the 3D surface 2 along a respective straight line 26, or is correlated thereto. The straight line 26 extends from the viewing position 14 through the image location 24 to the 3D surface 2. In the example, this is illustrated by way of example for the image locations 24*a-c* or the distances Aa-c and depth dimensions Ta-c. In the example, all depth dimensions T are initially saved or entered or stored in a separate depth image 34 (see FIG. 3), which are symbolized here as circles.

The 2D image 18 is a digital image with pixels 36, with each of the pixels 36 being selected as one of the image locations 24. Since the projection of a pixel 36 or extended image location 24 starting from the viewing position 14 covers a specific region of the 3D surface, the distances A between the pixel 36 and the 3D surface 2 are not all the same. For this reason, a total value of all distances A occurring in the pixel 36 is ascertained, here an arithmetic average, for determining the depth dimension T.

The projection image 10 is ascertained by a known rendering algorithm from the 3D surface 2. Using the rendering algorithm, at the same time all distances A are simultaneously ascertained, which is why the described method is real-time-capable.

The image locations 24a,b are here in each case the imaging or projection locations of the marker locations 20a,b on the viewing area 8 and thus in the 2D image 18. The image location 24c is an exemplary imaging location of a point of the hill 6b of the terrain 4 in the 3D surface 2. If a corresponding straight line 26 through an image location 24, starting from the viewing position 14, is not incident on the 3D surface 2, a distance A that corresponds to the value "infinite" is selected.

The depth dimensions T are the distances A normalized to a standard value A0. The standard value A0 is here the minimum of all distances A ascertained for the image locations 24 of the viewing area 8.

A marker field 28 is now produced successively for all marker locations 20 in the 2D image 18. This is done in each case successively for one marker location 20 after the other. In the example, a priority, or order, for the marker locations 20 in the order 20a,b is selected. The placement of the marker fields 28a,b in the 2D image 18 is effected in this order, in the present case until both marker fields have been placed. The order is here determined by relevance in the present context for the 2D image 18. The relevance is decided by the number of inhabitants of the towns SA, SB. Since the number of inhabitants of town SA is greater than that of town SB and is therefore more important for the presentation in the 2D image 18, it is preferred with respect to the order.

The associated marker field 28a is then arranged as closely as possible, that is to say with the smallest possible distance 30, at the image location 24a. The principle placement of the marker fields 28a,b is effected in accordance with the known, above-mentioned particle-based labelling algorithm. Here, it is necessary to satisfy the additional condition that all image locations 24, which are covered by the marker field 28a, must each have depth dimensions T that are greater than the depth dimension Ta of the image location 24a of the marker location 20a.

Figure 2:
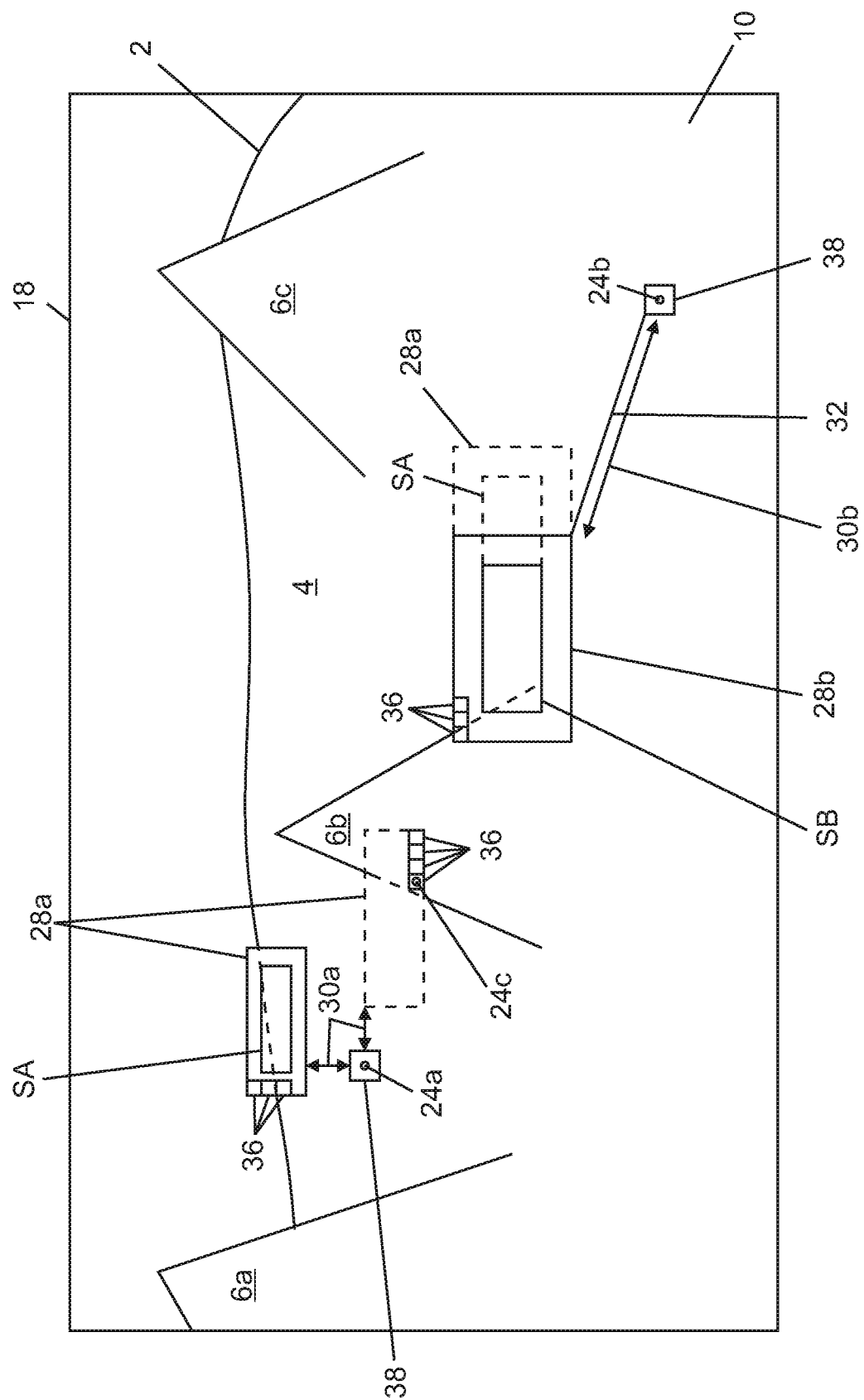
FIG. 2 shows a 2D image produced on the viewing area of FIG. 1.

For a desired dashed positioning in FIG. 2, this condition is not fulfilled, because the image location 24c has a depth dimension Tc that is smaller than the depth dimension Ta. In other words, viewed from the viewing position 14, the hill 6b is closer than the town SA. For this reason, for the marker held 28a a different position, specifically the position which is illustrated in extended fashion, is selected, which does not occlude part of the hill 6b. Here, all image locations 24 (indicated in representative fashion in FIG. 2 only by a few circles) which are covered by the marker field 28a have respective depth dimensions T which are greater than the depth dimension Ta. A corresponding procedure is applied to the marker field 28b.

For the marker field 28b, the occlusion of the hill 6b is not a problem, because the depth dimension Tb is smaller than all depth dimensions of all image locations 24 which are occluded by the marker field 28b, especially all portions of the hill 6b, but also of the remaining terrain 4.

A further criterion during the placement of the second and of all further marker fields 28 is that they must be placed without occlusion with respect to the previously already placed marker fields 28. Consequently, the marker field 28b must also be placed such that it does not occlude the marker field 28a. To this end, when placing a specific marker field 28, all image locations 24 which are already covered by placed marker fields 28 are here marked as occupied and are therefore no longer available for placement of a further marker field 28.

Alternatively, the method would be stopped if, after placement of the marker field 28a, no space were left in the 2D image for the marker field 28b. This is why the marker location 20a is placed first.

After placement of all marker fields 28, in the example of the marker fields 28a,b, in the 2D image 18, the projection image 10 of the 3D surface 2 is arranged therebehind in the 2D image 18.

Since the marker field 28b in the 2D image 18 in the present case had to be placed at a relatively great distance (greater than a critical distance) from the image location 24b due to other placement conditions (not explained in more detail), a line 32 is drawn in the 2D image 18 from the marker field 28b to the image location 24b, to symbolize their mutual association.

In addition, the image locations 24a,b of the marker locations 20a,b in the 2D image 18 are denoted by a graphic marker 38, here a square. This marking takes place even if the corresponding marker field 28 were no longer placeable. In this way, at least the marker location 20 of a corresponding POI is indicated in the 2D image 18, even if it is not possible to present the description thereof in the form of the marker field 28.

The marking by graphic markers 38 is effected in particular before placement of the marker fields 28 begins and is done for all image locations 24 of all marker locations 20 in the part of the 3D surface 2 to be presented.

In each case the marker SA, SB in the form of the town name is entered into the marker field 28, here in the form of the alphanumeric denotation of the marker location 24a,b, that is to say here as names of the towns at the marker locations 24a,b. The size of the respective marker field 28 is determined here by the content thereof. Since the name of the town "SB" is shorter than that of the town "SA", the marker SA is longer than the marker SB. The marker field 28a, which is matched to the size of the markers SA, SB, is longer—with the same scaling—than the marker field 28b. A comparison size of the marker field 28a with respect to the marker field 28b with the same scaling is indicated in dashed lines in FIG. 2. The total size of the marker field (after scaling) is additionally selected in dependence on its associated depth dimension T of the marker location 20. The marker field 28a is therefore scaled smaller than the marker field 28b. For the size scaling, an effective minimum and an effective maximum are established, that is to say the marker fields 28 will be scaled neither smaller than the minimum nor greater than the maximum. In the example, the marker field 28a is the smallest possible scaling, such that the town name "SA" is still sufficiently legible. The marker field 28a thus has the smallest possible length and width and font size. The marker field 28b is maximally scaled, with the result that none of the marker fields 28 could have a greater height or font size for text contained. The width is here also delimited in accordance with the indication for the equally scaled marker field 28a to the corresponding width.

Figure 3:
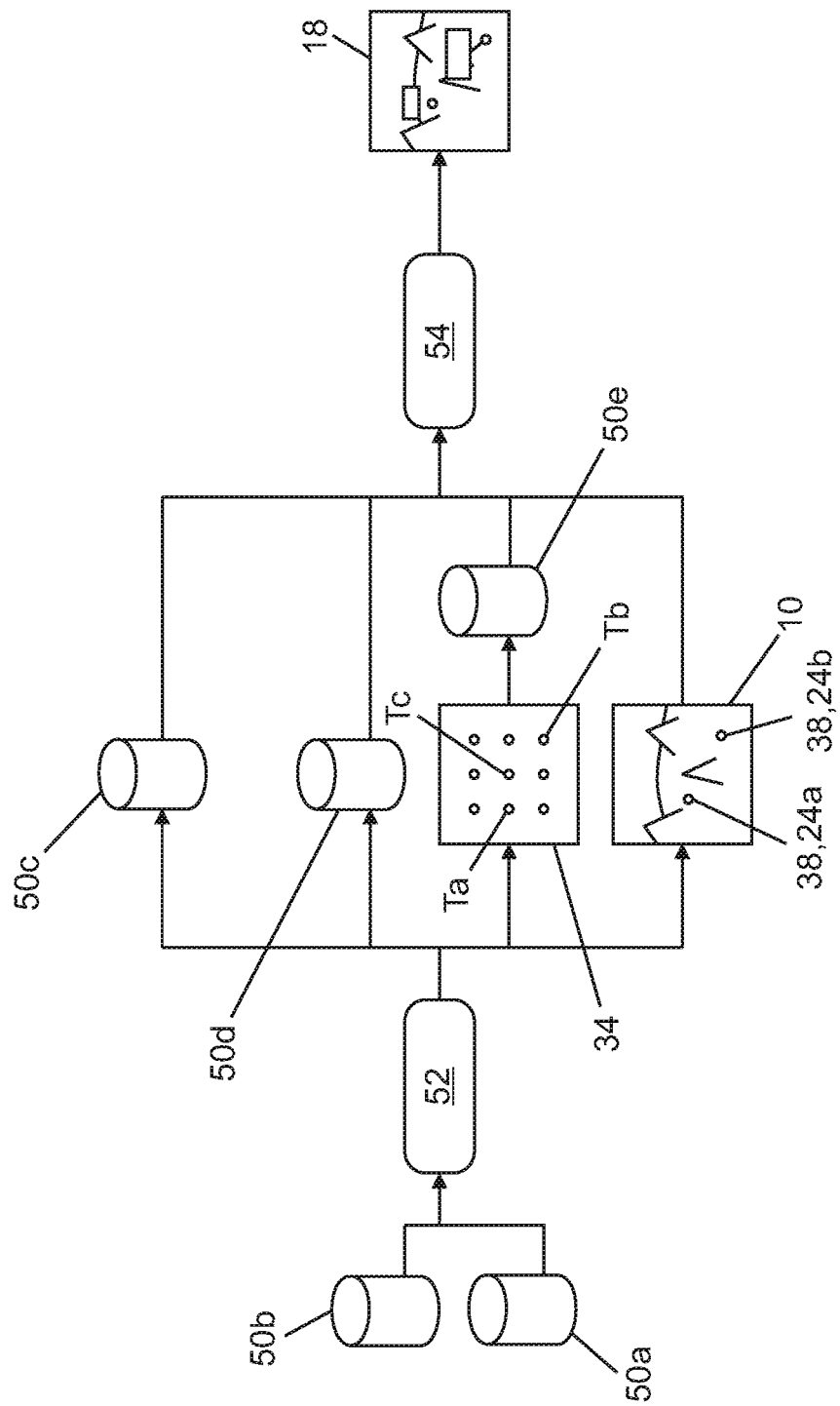
FIG. 3 shows a flowchart for the method according to the invention.

FIG. 3 shows the schematic flow of a method for producing the 2D image 18. The 3D surface 2 or the describing data structure is saved as "terrain data" in a data memory 50a. Data relating to the marker locations 20a,b and designations (markers SA, SB, POI data) are saved in the data memory 50b. First, the corresponding data from the data memories 50a,b are subjected to rendering 52. The sizes of the marker fields 28, or markers SA, SB, are ascertained herefrom in a data memory 50c in the form of what are called label sizes. In addition, the image locations 24 of the marker locations 20 are saved as POI positions and the corresponding distances A are saved in the form of distances in a data memory 50d. In addition, a depth image 34 is produced, which contains at each image point or image location 24 or pixel 36 in accordance with the geometry of the 2D image 18 the corresponding depth dimension T. The corresponding information is stored as what are known as depth particles in the data memory 50e. In addition, the projection image 10 is produced, in which graphic markers 38 have already been inserted at the image locations 24a,b of the marker locations 20a,b (POI positions). This is thus typically a colour image with POIs. The elements mentioned are joined together in a step of labelling 54 to produce the 2D image 18. In particular, the selection, definition of the order of the placement, ascertainment of the distances A and scaling of the marker fields 28 are performed here.

LIST OF REFERENCE SIGNS 2 3D surface
4 terrain
6a-c hill
8 viewing area
10 projection image
12 vision cone
14 viewing position
16 straight line of sight
18 2D image
20a,b marker location
24a-c image location
26a-c straight line
28a,b marker field
30a,b distance
32 line
34 depth image
36 pixel
38 graphic marker
50a-e data memory
52 rendering
54 labelling
SA,SB marker
Ta-c depth dimension
Aa-c distance

What is claimed is:

1. A method for producing a 2D image of a 3D surface on a viewing area of a vision cone which extends from a viewing position to the 3D surface, wherein at least one marker location is assigned to the 3D surface, comprising:
    assigning to each image location of the viewing area a depth dimension (T), which is correlated to the respective distance (A) between the viewing area and the 3D surface along a respective straight line from the viewing position through the image location to the 3D surface,
    for at least one of the marker locations located within the vision cone, producing a marker field is produced in the 2D image, wherein the marker field in the 2D image is placed as closely as possible to the image location of the marker location, with the additional condition that all image locations of the marker field have depth dimensions (T) which are greater than the depth dimension (Ta,b) of the image location of the marker location, and
    after placement of the marker fields placing a projection image of the 3D surface onto the viewing area is placed therebehind in the 2D image.

2. The method according to claim 1, wherein the 2D image is a digital image with pixels, with each of the pixels being selected as one of the image locations.

3. The method according to claim 2, wherein a total value for all distances (A) within a projection cone of the relevant image location onto the 3D surface is ascertained as a depth dimension (T) for an image location corresponding to a pixel.

4. The method according to claim 1, wherein the projection image is ascertained by a known rendering algorithm from the 3D surface.

5. The method according to claim 1, wherein an order for the marker locations is determined and the placement of the marker fields is performed in that order until either all marker fields are placed or until no more space is left in the 2D image for a further marker field.

6. The method according to claim 1, wherein at least one of the image locations of the marker locations is denoted in the 2D image.

7. The method according to claim 6, wherein the image location is denoted by a graphic marker.

8. The method according to claim 1, wherein a second and each further marker field is arranged in the 2D image in an occlusion-free manner with respect to already placed marker fields.

9. The method according to claim 1, wherein a location of a real and/or virtual camera for recording the projection image of the 3D surface is selected as the viewing position.

10. The method according to claim 1, wherein a terrain of the Earth's surface is used as the 3D surface and/or a position of an aeroplane with respect to the 3D surface is used as the viewing position and/or at least part of a viewing field from an aeroplane is selected as the viewing area.

11. The method according to claim 1, wherein an alphanumeric denotation of the marker location is inserted into the marker field.

12. The method according to claim 1, wherein a size of the marker field is determined in dependence on its content.

13. The method according to claim 1, wherein a size of the marker field is selected in dependence on the depth dimension (Ta,b) of the associated marker location.

14. The method according to claim 13, wherein for all marker fields, scaling of their size between a minimum and a maximum dimension is performed.

15. The method according to claim 1, wherein the placement as closely as possible to the image location of the marker location is performed on the basis of a placement strategy in accordance with a particle-based labelling algorithm.

* * * * *